United States Patent
Ono (10) Patent No.: US 7,266,237 B1
(45) Date of Patent: Sep. 4, 2007

(54) SYSTEM AND METHOD FOR A HEURISTICS-BASED APPROACH FOR DETERMINING A NUMBER OF COLORS IN AN IMAGE

(75) Inventor: Tarik Ono, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 703 days.

(21) Appl. No.: 10/816,555

(22) Filed: Mar. 31, 2004

(51) Int. Cl.
*G06K 9/00* (2006.01)

(52) U.S. Cl. ............... 382/162; 382/164; 382/165; 358/515; 358/518

(58) Field of Classification Search ............... 382/164, 382/165, 166, 219; 358/515, 518, 520
See application file for complete search history.

(56) References Cited

U.S. PATENT DOCUMENTS

| | | | |
|---|---|---|---|
| 5,089,884 A * | 2/1992 | Suzuki et al. ............... 358/539 |
| 5,374,955 A * | 12/1994 | Furuhata et al. ............ 348/264 |
| 5,541,653 A * | 7/1996 | Peters et al. ................. 348/264 |
| 5,818,970 A * | 10/1998 | Ishikawa et al. ............ 382/248 |
| 6,515,698 B1 * | 2/2003 | Sasaki et al. ............ 348/231.6 |

\* cited by examiner

*Primary Examiner*—Yosef Kassa
(74) *Attorney, Agent, or Firm*—Martine Penilla & Gencarella, LLP (57) ABSTRACT

A method for determining a number of colors in a digital image includes receiving a digital image and determining a total number of pixels in the digital image. A proportion of the total number of pixels is selected as having an infrequent color and a respective color for each one of a first portion of the pixels is determined. The respective colors are analyzed to determine whether the respective colors include greater than or equal to the selected proportion infrequent color. If the respective colors include greater than or equal to the selected proportion of infrequent colors then a first subsequent process is selected. If the respective colors include less than the selected proportion of pixels having the infrequent color then a second subsequent process is selected. A system for determining a number of colors in a digital image is also described.

18 Claims, 7 Drawing Sheets

SYSTEM AND METHOD FOR A HEURISTICS-BASED APPROACH FOR DETERMINING A NUMBER OF COLORS IN AN IMAGE

BACKGROUND OF THE INVENTION

1. Field of the Invention

The present invention relates generally to analyzing digital images, and more particularly, to methods and systems for determining the various colors included in a digital image.

2. Description of the Related Art

Digital images are used extensively for many purposes. Digital images offer many advantages over photographic images because digital images can easily be electronically indexed, archived, retrieved and distributed, among many other uses. As a result of the many uses, digital images are often transferred across all types of communication networks.

Digital images are typically relatively large-sized data files. Due to the frequent distribution of digital images, many different approaches have been used to increase the efficiency with which the relatively large file sizes can be distributed. Some of the approaches have focused on compressing the digital image using various compression schemes.

The process of compressing a digital image requires the digital image to be analyzed to determine the type of digital image. For example, digital images can be classified according to the number of colors included in the digital image. A digital image with fewer colors can be more easily compressed than can an image having a greater number of colors. Therefore, a first compression scheme may be optimized for compressing a digital image with a relatively few colors (e.g., less than about 16 colors) whereas a second compression scheme may be optimized for digital images having many colors (e.g., more than about 16 colors or 256 or more colors). The first compression scheme would generally operate faster than the second compression scheme and therefore would be more efficient to use if the digital image has few colors.

However, each individual pixel of the digital image must be analyzed to determine the respective color of each of the pixels. The color of each of the pixels must be determined to determine the actual number of colors included in the digital image. Once the entire digital image has been analyzed, then the most efficient compression scheme can be selected.

As a result, the typical digital image compression process requires each and every one of the pixels in the digital image to be processed twice. First, each and every one of the pixels must be analyzed to determine the appropriate compression scheme. Then, each and every one of the pixels must again be processed by the selected compression scheme. As a result, the process of selecting the compression scheme and compressing the digital image can require a relatively extended processing time. This extended processing time can therefore delay the use (e.g., distribution, retrieval, storing, etc.) of the digital image.

Another approach is to process the digital image through each one of multiple compression schemes and then select the compression scheme that yielded the most efficient results. However, this approach can easily consume even more time and processing resources than analyzing each pixel of the digital image.

Still another approach is to select a compression scheme that is ideal for a worst-case scenario (i.e., where the maximum number of colors are present in the digital image). However, under this approach, the single selected compression scheme is not the most efficient because many of the digital images will have fewer than the maximum number of colors. In view of the foregoing, there is a need for a more efficient system and method for selecting and applying an appropriate compression scheme to a digital image.

SUMMARY OF THE INVENTION

Broadly speaking, the present invention fills these needs by providing a more efficient system and method for selecting and applying a compression scheme for a digital image. It should be appreciated that the present invention can be implemented in numerous ways, including as a process, an apparatus, a system, computer readable media, or a device. Several inventive embodiments of the present invention are described below.

One embodiment provides a method for determining a number of colors in a digital image includes receiving a digital image and determining a total number of pixels in the digital image. A proportion of the total number of pixels is selected as having an infrequent color and a respective color for each one of a first portion of the pixels is determined. The respective colors are analyzed to determine whether the respective colors include greater than or equal to the selected proportion of infrequent color. If the respective colors include greater than or equal to the selected proportion of infrequent colors then a first subsequent process is selected. If the respective colors include less than the selected proportion of pixels having the infrequent color then a second subsequent process is selected.

A frequent color can include a color that occurs greater than or equal to the proportion of the total number of pixels divided by a product of a selected number of frequent colors and an estimating factor. The estimating factor can have a value of at least 1. The estimating factor can also be a function of a number of pixels included in the first portion of the pixels.

If the respective colors include greater than or equal to the selected proportion of infrequent colors then the first subsequent process can be applied and a performance factor of the first subsequent process can be determined. If the respective colors include less than the selected proportion of infrequent colors then the second subsequent process can be applied and the performance factor of the second subsequent process can be determined. The estimating factor can be modified with a function of the performance factor. The processed digital image can also be output where the processed digital image has been processed in one of the first subsequent process and the second subsequent process.

The frequent color can include more than one frequent color. Selecting a proportion of the total number of pixels as being a frequent color can also include selecting a number of frequent colors. The frequent color can include less than or equal to about sixteen frequent colors.

The first subsequent process can include a first compression scheme. The second subsequent process can include a second compression scheme.

Selecting the second subsequent process can also include determining if a set of selected pixels is greater than or equal to a proportion of frequent color pixels. If the set of selected pixels is greater than or equal to a proportion of frequent color pixels then the second subsequent process can be selected. If the set of selected pixels is less than a proportion of frequent color pixels then a subsequent portion of pixels are selected and a respective color for each one of the subsequent portion of the pixels is determined.

Another embodiment provides a method for determining a number of colors in a digital image. The method includes receiving a digital image and determining a total number of pixels in the digital image. A proportion of the total number of pixels as having one of a set of frequent colors is selected. A frequent color includes a color that occurs greater than or equal to the proportion of the total number of pixels divided by a selected number of frequent colors. A respective color for each one of a first portion of the pixels is determined and the respective colors are analyzed to determine whether the respective colors include greater than or equal to the selected proportion of pixels having one of the frequent colors. If the respective colors include greater than or equal to the selected proportion of pixels having one of the frequent colors then a first compression scheme is selected. If the respective colors include less than the selected proportion of pixels having one of the frequent colors then a second compression scheme is selected.

Yet another embodiment provides a system for determining a number of colors in a digital image that includes a first computer system. The first computer system includes logic for receiving a digital image and logic for determining a total number of pixels in the digital image. The first computer system also includes logic for selecting a proportion of the total number of pixels as having a frequent color and logic for determining a respective color for each on of a first portion of the pixels. The first computer system also includes logic for analyzing the respective colors to determine whether the respective colors include greater than or equal to the selected proportion of pixels having the frequent color. If the respective colors include greater than or equal to the selected proportion of pixels having the frequent color then a first subsequent process is selected. If the respective colors include less than the selected proportion of pixels having the frequent color then a second subsequent process is selected.

The system can also include logic for applying the first subsequent process, if the respective colors include greater than or equal to the selected proportion of pixels having the frequent color, and determining a performance factor of the first subsequent process. Also included is logic for applying the second subsequent process, if the respective colors include less than the selected proportion of pixels having the frequent color, and determining the performance factor of the second subsequent process.

The system can also include logic for outputting the processed digital image. The processed digital image has been processed in one of the first subsequent process and the second subsequent process.

The first computer system can also include a network interface. The network interface can couple the first computer system to a second computer system, and the logic for outputting the processed digital image includes logic for outputting the processed digital image to the second computer system.

The present invention provides a more processing efficient and less time consuming system and method for determining the number of colors in a digital image. This can be especially advantageous in a system where images are often distributed to multiple users.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION OF THE EXEMPLARY EMBODIMENTS

Several exemplary embodiments for a more efficient system and method of determining the number of colors in a digital image will now be described. It will be apparent to those skilled in the art that the present invention may be practiced without some or all of the specific details set forth herein.

The present invention can be used any time it is useful to quantify the number of colors included within a digital image. By way of example, the present invention can be used to determine whether most of the pixels in a digital image are of only a limited number of colors (e.g., 90% or more of the pixels are of one of 8 colors). Determining whether most of the pixels in an image are only a few colors can be useful in subsequent processing of the image. By way of example, if only a few colors make up most of the pixels of an image, then a first compression scheme may be a more processing efficient choice than a second compression scheme for compressing the digital image. Increasing the efficiency of digital image compression processes can be very useful in a remote display application or other applications that, for example, use, distribute, store, or access digital images.

Identifying the appropriate compression scheme typically requires a relatively long processing time and extensive CPU processing. As described above, in conventional practice, each and every pixel on the digital image is typically processed multiple times to identify the most efficient compression scheme and to actually apply the selected compression scheme to the digital image.

A more efficient approach is to quickly estimate a distribution of colors contained in the digital image and then select compression scheme that is appropriate for the estimated number of colors. The number of colors in the digital image can be estimated by analyzing only a portion of the total number of pixels in the digital image. The portion of the total number of pixels can include a proportion of frequent color pixels having the few "most frequently" occurring colors, and a remainder of "infrequent color" pixels. The selected compression scheme may not be ideal for the digital image as the actual number of colors may exceed the estimated number of colors. However, the selected compression scheme would be selected more quickly and the compression scheme can therefore be applied more quickly. As a result, the overall time required to complete the digital image compression process is reduced and the overall time to use, distribute, store, or access digital image is also reduced.

While the following embodiments are described in terms of determining the colors of the pixels in a digital image so that an appropriate compression scheme can be selected, it should be understood that the described embodiments for determining the colors of the pixels in the digital image are not limited to selecting the appropriate compression scheme. The described embodiments for determining the colors of the pixels in the digital image can be used in conjunction with any other process that may need to determine the colors of the pixels in the digital image.

By way of example, a given digital image is analyzed to determine whether at least a selected percentage (P %) of the pixels are of one of a few colors (i.e., a few most frequent colors) as can be expressed in the following relationship:

$$(P\%)*PIX\_NUM = \text{number of pixels having the most frequent colors}$$

Where PIX_NUM is the number of pixels in the digital image.

The above relationship allows the digital image to be analyzed to find out whether the digital image contains the selected percentage pixels that are the few most frequent colors.

Figure 1A:
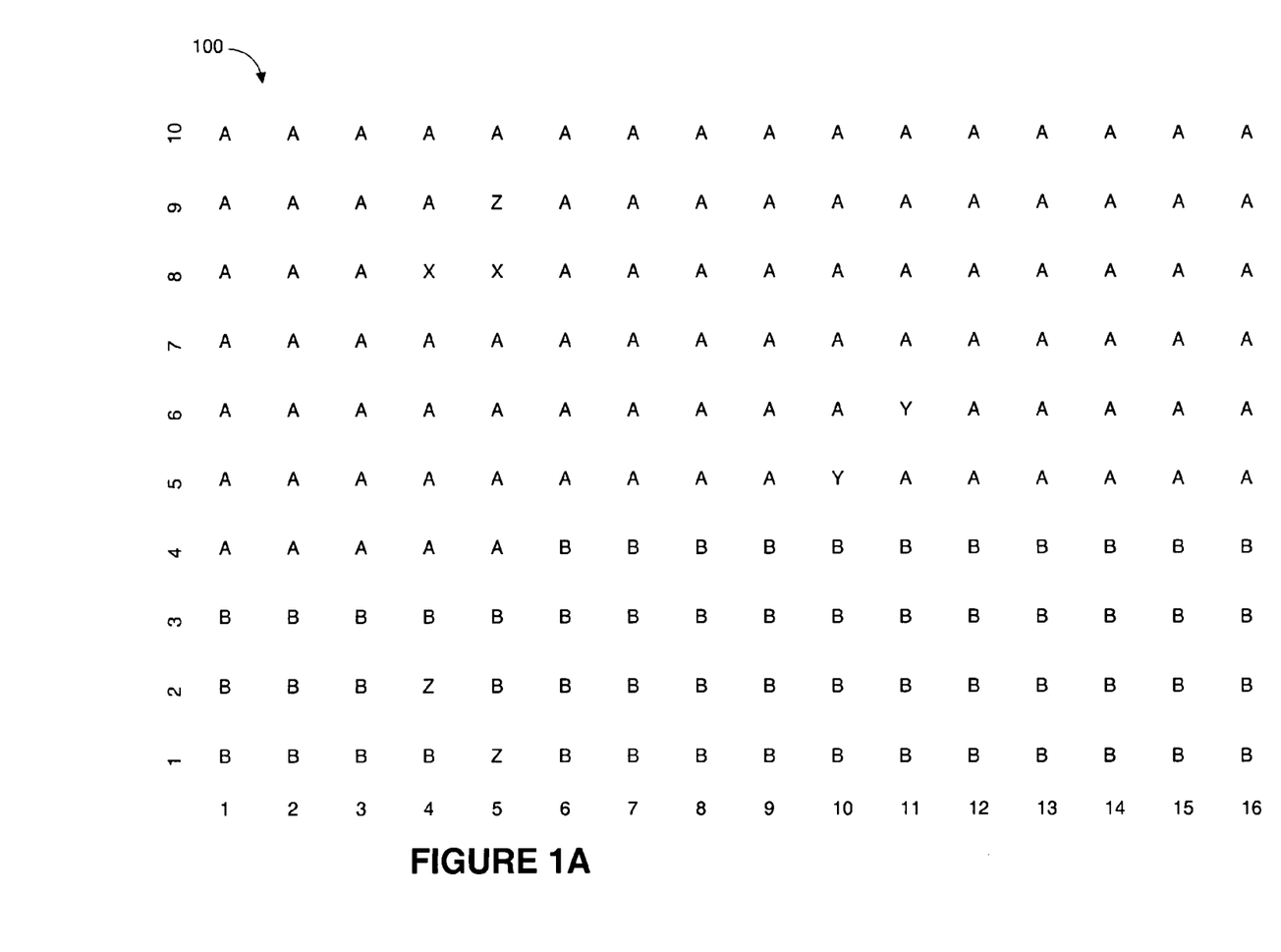
FIG. 1A is a representation of a digital image, in accordance with one embodiment of the present invention.

FIG. 1A is a representation of a digital image 100, in accordance with one embodiment of the present invention. The digital image 100 is shown as a 10-pixel by 16-pixel array of 160 pixels. Each pixel is represented as an alphabetic character. A different color pixel is represented by a different alphabetic character (e.g., an "A" represents a pixel having a color A and a "B" represents a pixel having a color B). Most of the 160 pixels are one of two most frequently occurring colors: color A or color B. However, several pixels are infrequent colors: color X, color Y and color Z. If the selected percentage of the pixels is 80%, and 80% of the 160 total pixels are of one of the two frequent colors (i.e., COL_NUM=2, where COL_NUM is the number of frequent colors), then the condition can be stated as shown in the following equation:

$$(80\%)*(160) = 128 \text{ pixels.}$$

If the digital image 100 has at least 128 pixels that are either color A or color B, then the digital image 100 satisfies this condition. Therefore, the digital image 100 can be analyzed by looking at the first 80% (128) of the pixels. If all 128 pixels are either color A or color B, then the condition is satisfied.

Stated in the inverse, if the digital image 100 has less than 33 pixels that have infrequent colors (i.e., colors X, Y and Z), then the digital image 100 satisfies this condition. The cut-off is 33 pixels because if 128 pixels must be either color A or color B, then no more than 32 pixels can be infrequent colors X, Y and Z. Therefore, the digital image 100 can be analyzed by looking at the pixels individually and when a $33^{rd}$ pixel is found to be one of the infrequent colors X, Y and Z, then the digital image 100 fails the condition. If however, 128 pixels are found to be either color A or color B, before $33^{rd}$ pixel is found to be one of the infrequent colors, then the condition is satisfied and the pixel by pixel analysis can stop immediately. Since 154 pixels in digital image 100 are either "A" or "B", this image would satisfy the condition.

In one embodiment all 160 pixels in the digital image 100 are analyzed and classified by color. Next the different colors are sorted according to frequency and a number (i.e., COL_NUM) of the most frequent colors are selected. If the sum of the pixel counts of the COL_NUM most frequent colors exceeds (P %)*PIX_NUM, then the image fulfills the condition. However, it is often not necessary to analyze all 160 pixels in the digital image 100 before determining if the image satisfies the condition.

Figure 1B:
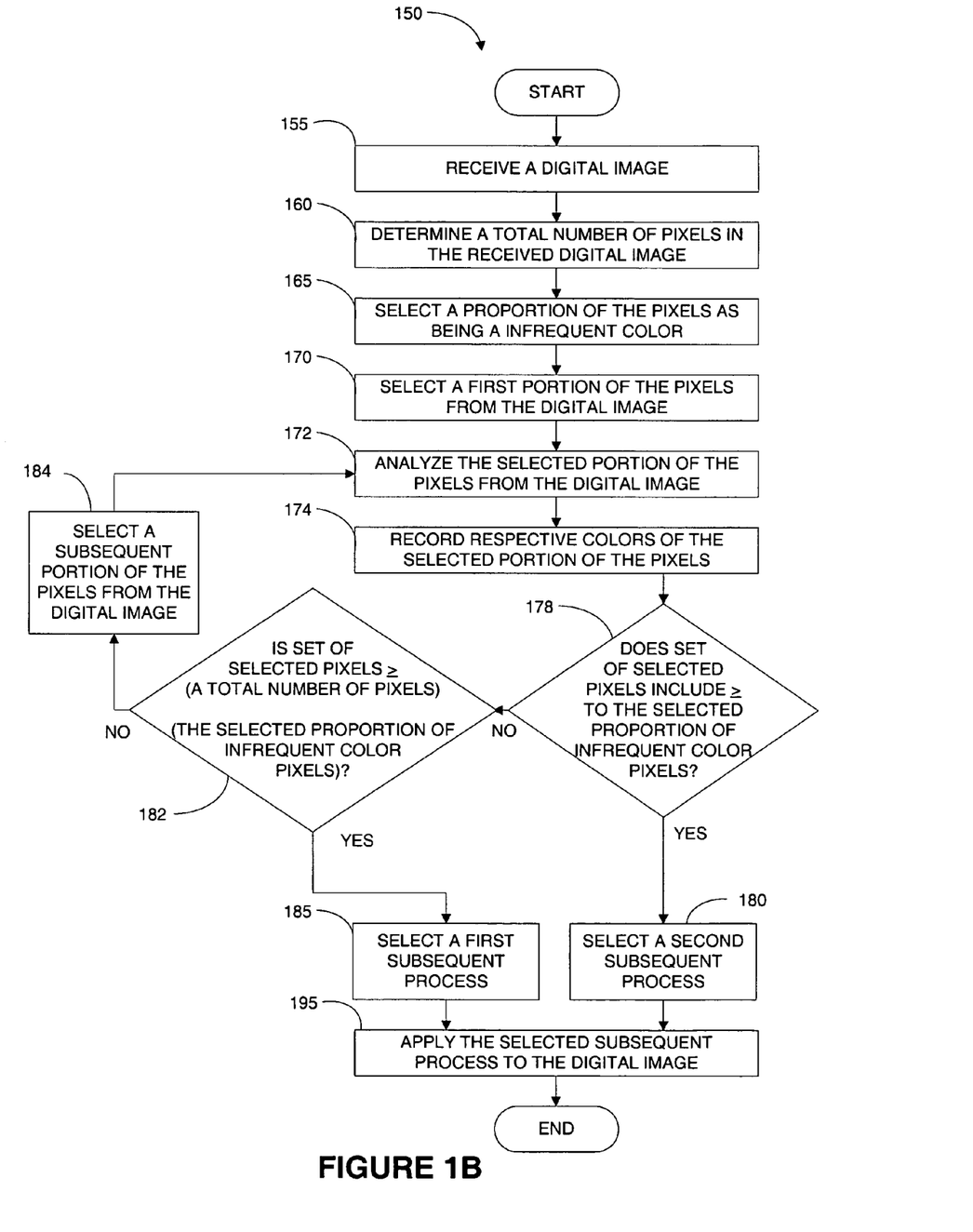
FIG. 1B is a flowchart of the method operations of determining a number of colors in a digital image, in accordance with one embodiment of the present invention.

FIG. 1B is a flowchart 150 of the method operations for determining a number of colors in a digital image, in accordance with one embodiment of the present invention. In an operation 155, the digital image is received for processing (e.g., in a computer or other image processing system). In an operation 160, a total number of pixels (i.e., PIX_NUM) in the image is determined. By way of example, the digital image 100 of FIG. 1A is an array of 160 pixels. In an operation 165, a proportion of the total pixels is selected as having an infrequent color. By way of example, if the selected proportion is 90% (i.e., 9/10) are frequent colors (i.e., 10% infrequent colors) and the digital image is an array of 160 pixels, then at least 144 of the 160 pixels must be frequent colors and no more than 16 pixels can be infrequent colors. Alternatively, if the selected proportion is 75% frequent colors and 25% infrequent colors and the digital image is an array of 160 pixels, then at least 120 of the 160 pixels must be frequent colors and no more than 40 pixels can be infrequent colors.

In an operation 170, a first portion of the pixels from the digital image is selected for analysis. The selected portion of the pixels can be as few as one of as many as desired. By way of example the selected portion can include 1, 5, 10 pixels or a percentage of the total number of pixels in the received digital image. In one embodiment, the selected portion can include a number of pixels equal to the selected proportion of infrequent colors.

In an operation 172, the selected portion of the pixels is analyzed. The selected portion of pixels is analyzed to determine the respective colors of the pixels. The respective colors of the pixels are recorded in an operation 174.

In an operation 178, the recorded colors of a selected set of pixels are analyzed to determine whether the recorded colors include greater than or equal to the selected proportion of infrequent colors. The selected set of pixels to be analyzed in operation 178 includes a cumulative set of all pixels that have been selected from the received digital image. By way of example, in a first iteration, the selected set of pixels will include only the first portion of pixels. As described below in operation 184, in selections of subsequent portions of pixels, the selected set of pixels includes the first portion of pixels and the subsequent portion of pixels. If, in operation 178, the recorded colors include greater than or equal to the selected proportion of infrequent colors, then the method operations continue in an operation 180.

In operation 180, a second subsequent process is selected and the method operations continue in operation 195. The second subsequent process can be a second compression scheme that is optimized for a digital image having greater than or equal to the selected proportion of infrequent colors (i.e., the digital image has many infrequent colors). The second subsequent process can also be any other type of process that can be used to process the digital image that has greater than or equal to the selected proportion of infrequent colors.

If in operation 178, the recorded colors include less than the selected proportion of infrequent colors, then the method operations continue in an operation 182. In an operation 182, the number of pixels in the digital image that have been analyzed is measured to determine if the number of pixels analyzed is greater than or equal to the proportion of total number of pixels in the image that must be frequent colors. By way of example, if the digital image contains 160 total pixels and the selected proportion of infrequent color pixels is 25%, therefore the percentage of frequent color pixels is 75% or 120 pixels. If 120 pixels have been analyzed and still the number of infrequent color pixels has not been exceeded (i.e., a "NO" result of operation 178) then the proportion of infrequent color pixels in the digital image cannot be equaled or exceeded. Since the proportion of infrequent color pixels cannot be equaled or exceeded, then the method operations can continue in an operation 185.

In operation 185, a first subsequent process is selected and the method operations continue in operation 195. The first subsequent process can be a first compression scheme that is optimized for a digital image that is mostly made up of only a few frequent colors. The first subsequent process can also be any other type of process that can be used to process the digital image that has less than the selected proportion of infrequent colors. In operation 195, the selected subsequent process is applied to the digital image.

If in operation 182, the number of pixels analyzed (i.e., the set of selected pixels) is less than the proportion of total number of pixels in the image that must be frequent colors, then the method operations continue in operation 184. In operation 184, a subsequent portion of the pixels of the digital image is selected and the method operations continue in operation 170 as described above. The subsequent portion of the pixels should not include any pixels that were previously analyzed. By way of example, the first portion selected in operation 170 above could include the first 10 pixels (e.g., pixels 1-10) and the subsequent portion of the pixels selected in operation 184 would include the second 10 pixels (e.g., pixels 11-20). Subsequent iterations of operation 184 would progressively select other non-previously selected pixels for analysis. While selecting the portions of the pixels to be analyzed has generally been described as including contiguous portions of the pixels (e.g., pixels 1-10) it should also be understood that any type of sampling of the pixels could be used to select the portion of the pixels to be analyzed, however the sampling method must also ensure that each pixel is selected only once. It should also be understood that a single pixel could be selected for each selected portion of the pixels. By way of example, in operation 170 the first pixel is selected and in operation 184 the second pixel would be selected and subsequent iterations of operation 184 the third, fourth, fifth, etc. and subsequent pixels would be selected, in subsequent iterations.

Figure 2:
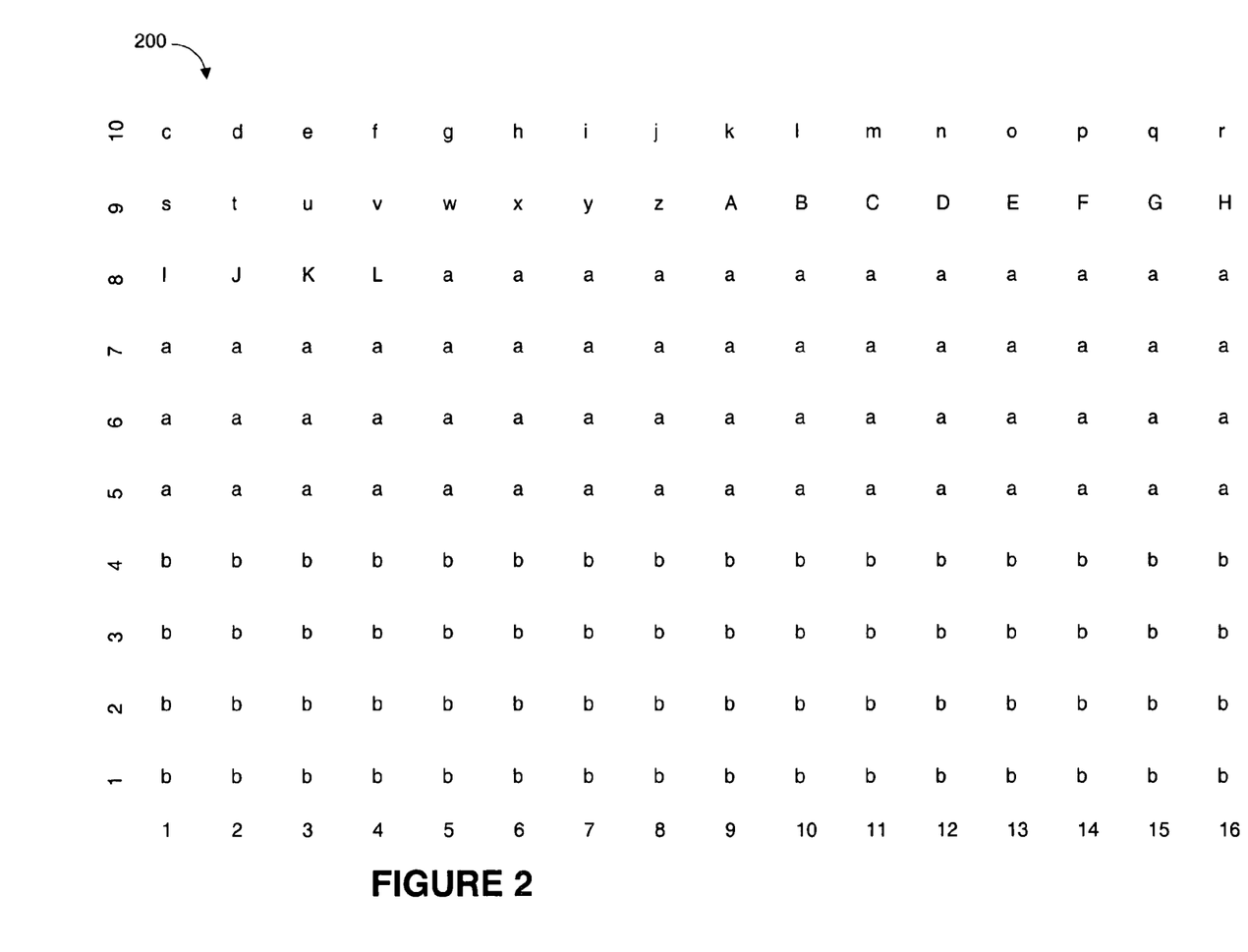
FIG. 2 is a representation of a digital image, in accordance with one embodiment of the present invention.

FIG. 2 is a representation of a digital image 200, in accordance with one embodiment of the present invention. The digital image 200 is shown as a 10-pixel by 16-pixel array of 160 pixels. Each pixel is represented as an alphabetic character, where pixels of the same color are represented by the same alphabetic character and uppercase and lowercase letters indicate different colors (e.g., "a" is not the same color as "A").

By way of example, if P=80%, COL_NUM=2, and the image has a total of 160 pixels, then the cutoff is ($80/100$)*160=128. Starting at the upper left corner and analyzing the first 35 pixels, which are all of different colors, the digital image 200 could not fulfill the condition that 128 pixels have one of the two frequent colors. Even if all of the remaining 125 pixels have one of the two frequent colors, the number of pixels of the two most frequent colors could at most be 125+2=127. Therefore, analyzing only the first 35 pixels can determine that the image 200 cannot satisfy the condition.

Figure 3:
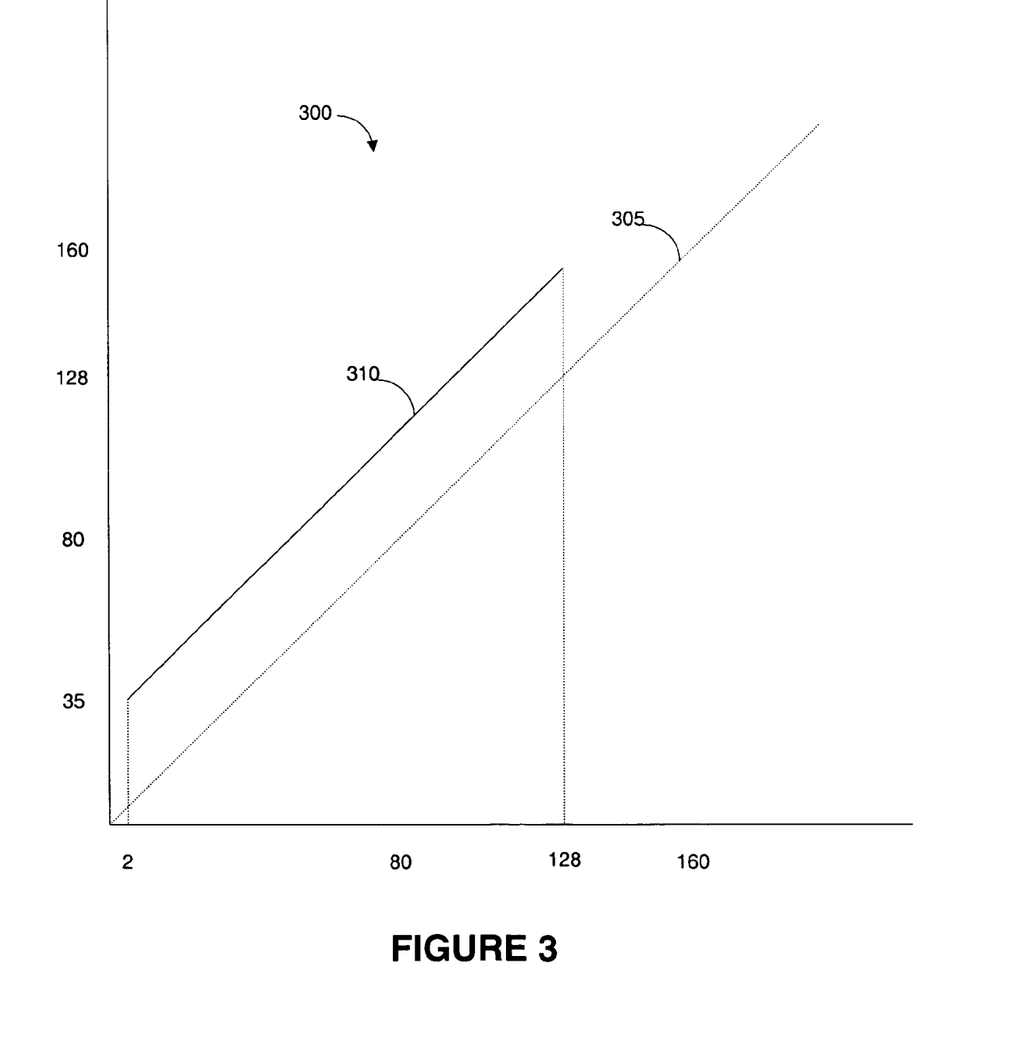
FIG. 3 is a graph of an analysis of the pixels in the digital image, in accordance with one embodiment of the present invention.

FIG. 3 is a graph 300 of an analysis of the pixels in the digital image 200 of FIG. 2, in accordance with one embodiment of the present invention. The X-axis shows the number of pixels that have one of the 2 most frequent colors. Note that the actual selection of the 2 most frequent colors may change as the image 200 is analyzed. By way of example, a color that was once the second most frequent color can become the third most frequent color as the color of more of the pixels are classified. Also, if more than 2 colors have the same frequency, then the choice of which 2 colors are the "frequent" colors may be arbitrary.

The Y-axis shows the number of pixels of the image read so far. Line 310 is a "failure line." If at any point during the analysis of the pixels a data point falls on or above the failure line 310, then the digital image 200 has failed the condition.

A line 305 is the "valid line." No valid data point can fall below the valid line 305 because the number of analyzed pixels can never be less than the total number of pixels of the two most frequent colors. Therefore, as digital image 200 is analyzed, as long as each data point determined from that analysis falls between the valid line 305 and the fail line 310, then the digital image can meet the condition. However, as soon as one data point falls on or above the fail line 310, then the digital image fails the condition.

Figure 4:
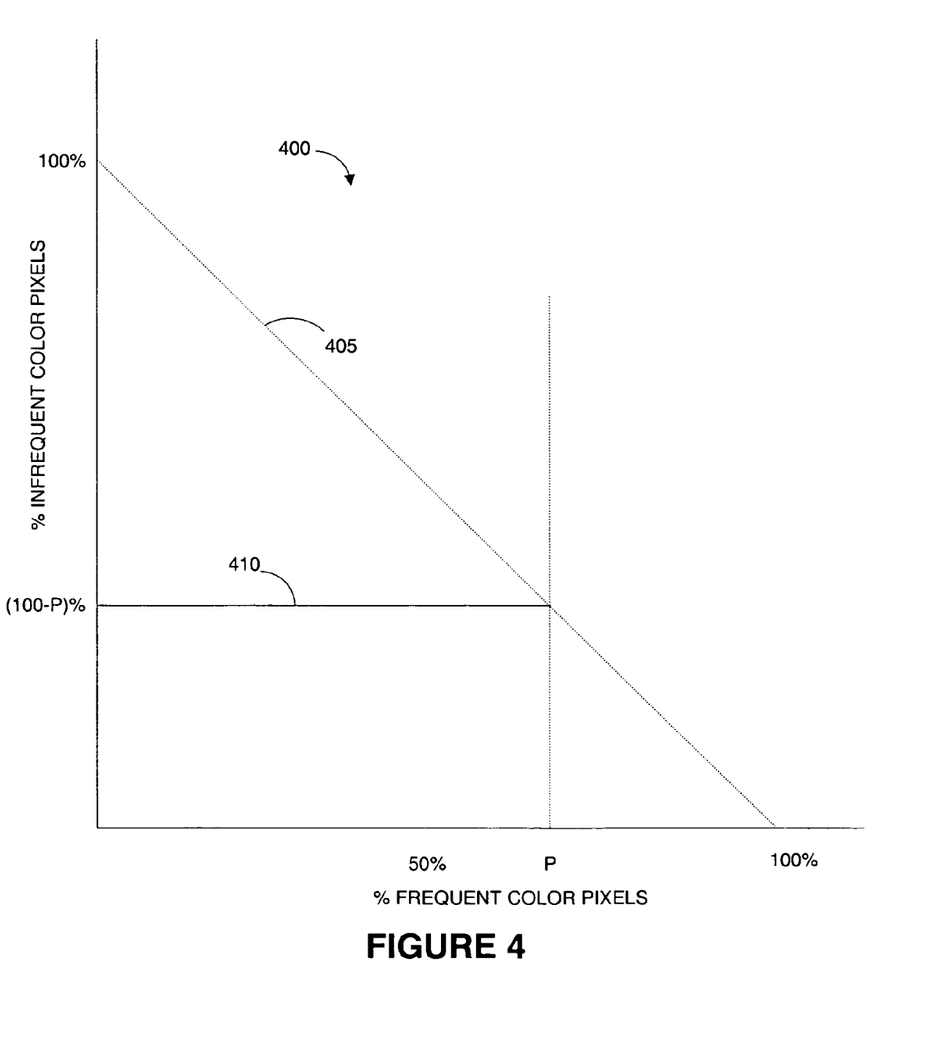
FIG. 4 is a graph of the analysis of the pixels in the digital image, in accordance with one embodiment of the present invention.

FIG. 4 is a graph 400 of the analysis of the pixels in the digital image 200 above, in accordance with one embodiment of the present invention. A line 410 is the failure line with respect to the relationship between infrequent color pixels on the Y-axis and frequent color pixels on the X-axis. If the number of infrequent color pixels is ever more than (100−P)% of all pixels, then the digital image fails the condition.

As shown in FIGS. 3 and 4, a digital image can be more quickly analyzed to determine whether the digital image satisfies or fails the stated condition. By way of example, only a few pixels (e.g., 30% of the all pixels) may be analyzed to predict whether the digital image satisfies or fails the condition rather than requiring all of the pixels to be analyzed.

Determining which frequent colors to select as the most frequent colors after determining the color of each and every pixel can be computationally expensive and slow. Therefore, heuristics can be used to predict which color is a frequent color rather than have computationally expensive and accurate computations.

If all frequent colors are equally likely to appear, then the average number of pixels of any frequent color is provided by the following relationship:

$$\frac{(P/100)*(\text{PIX\_NUM})}{\text{COL\_NUM}}.$$

Once a selected color has more than (P/100)*PIX_NUM/COL_NUM pixels, then the selected color can be defined as a frequent color. However, oftentimes a frequent color will have fewer than (P/100)*PIX_NUM_NUM pixels. Therefore, the requirement can be relaxed somewhat and designate a selected color as a frequent color, if the color satisfies the following relationship:

(P/100)*PIX_NUM/(COL_NUM*N)<pixels have the selected color;

where N is an estimating factor for estimating a number of frequent colors. The estimating factor N has a value at least 1. The estimating factor N can also have a value such as about 2.5 or 4. Alternatively, the estimating factor N can be a function of pixels analyzed so far, or of frequent color pixels analyzed so far, or some other function that does not consume excess time or CPU processing.

Once the number of frequent colors is determined, no more colors can become frequent colors. Note that designating colors as frequent through this scheme can introduce some cases where a first color is thought to be one of the most frequent colors, but then turns out to not be. Similarly, a second color may be considered to be an infrequent color when the second color is eventually determined to be a frequent color. The accuracy of N depends on the color distribution in the image. It should be understood that decision over which color is a frequent color should be correct most of the time and is specifically not required to be correct all of the time.

The valid line 405, shown in FIG. 4, is determined by a number of colors that have been designated as frequent colors so far, and that number could be less than actual number of frequent colors. The fewer colors that are considered as frequent colors, the more pixels are still counted as having infrequent colors that might eventually become pixels having one of the frequent colors. Therefore, the valid line 405 depends on the number of colors analyzed so far as well as the number of frequent colors. The following describes the relationship:

$$(100-P)*PIX\_NUM*f(X)$$

where X is the number of colors designated frequent colors so far and f(X) is a suitable function.

Figure 5:
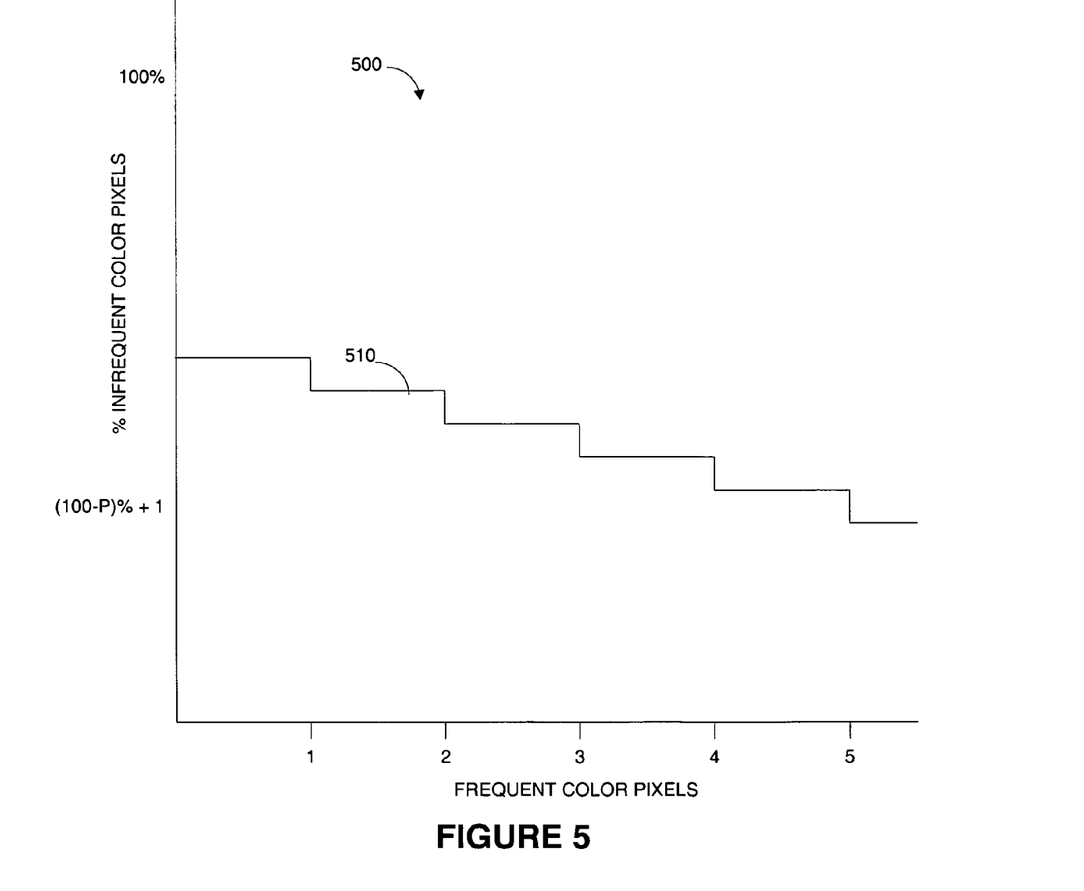
FIG. 5 shows another graph of the analysis of the pixels in the digital image, in accordance with one embodiment of the present invention.

FIG. 5 shows another graph 500 of the analysis of the pixels in the digital image 200, in accordance with one embodiment of the present invention. A failure line 510 is shown where f(X) is a piecewise linear function and can easily be encoded in a lookup table. In a simple case, f(X) is a constant, e.g. (100−P+5)*PIX_NUM. The function "f(X)" can also be determined by previous processes or by a trial-and-error approach. Note that because the number of colors designated as frequent colors are not necessarily equal to the actual number of frequent colors, the number of pixels that this method counts as having a frequent color will typically underestimate the actual number of frequent color pixels. Therefore, even when all pixels have been analyzed, the failure line 510 should allow for that possibility.

In another embodiment, the value of "N" and the function "f(X)" can be adjusted by the results of the subsequent application. By way of example, a compression scheme optimized for few colors (e.g., less than 16 colors) can typically compress a digital image having 16 or fewer colors at a compression ratio of 6:1. However, if the actual compression ratio achieved is only 4:1, then one cause may be that too many images with more than 16 colors are passing the test as having 16 colors or fewer. Therefore, the values of "N" and "f(X)" can then be adjusted to increase the accuracy of the analysis of each digital image.

Figure 6:
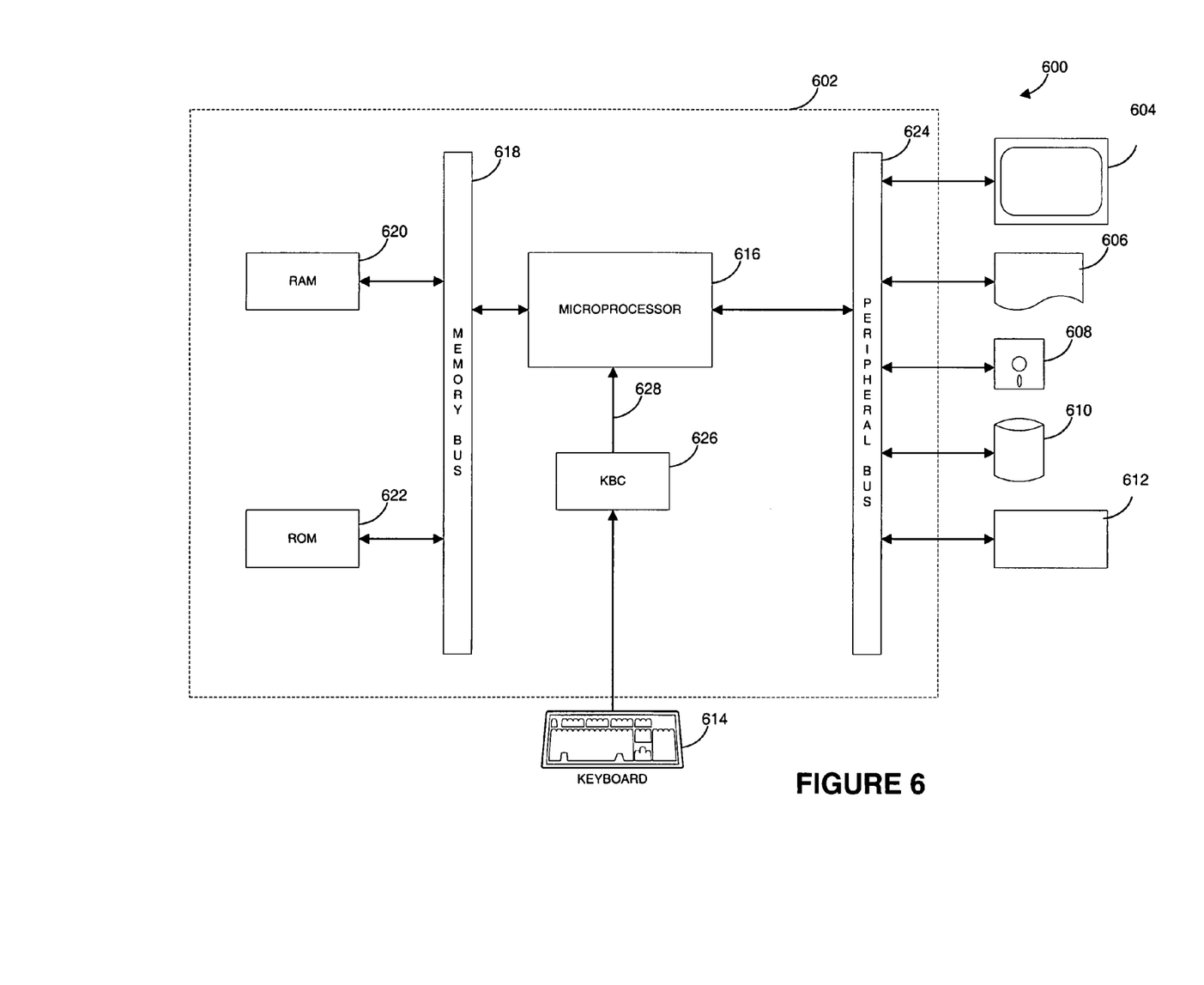
FIG. 6 is a block diagram of an exemplary computer system for processing a digital image, in accordance with one embodiment of the present invention.

FIG. 6 is a block diagram of an exemplary computer system 600 for processing a digital image, in accordance with one embodiment of the present invention. The computer system 600 includes a digital computer 602, a display screen (or monitor) 604, a printer 606, a floppy disk drive 608, a hard disk drive 610, a network interface 612, and a keyboard 614. The digital computer 602 includes a microprocessor 616, a memory bus 618, random access memory (RAM) 620, read only memory (ROM) 622, a peripheral bus 624, and a keyboard controller (KBC) 626. The digital computer 602 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 616 is a general-purpose digital processor, which controls the operation of the computer system 600. The microprocessor 616 can be a single-chip processor or can be implemented with multiple components. Using instructions retrieved from memory, the microprocessor 616 controls the reception and manipulation of input data and the output and display of data on output devices.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the printer device 606, the floppy disk drive 608, the hard disk drive 610, and the network interface 612. The keyboard controller 626 is used to receive input from keyboard 614 and send decoded symbols for each pressed key to microprocessor 616 over bus 628.

The display screen 604 is an output device that displays images of data provided by the microprocessor 616 via the peripheral bus 624 or provided by other components in the computer system 600. The printer device 606, when operating as a printer, provides an image on a sheet of paper or a similar surface. Other output devices such as a plotter, typesetter, etc. can be used in place of, or in addition to, the printer device 606.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 610. The computer code and data could also reside on a removable program medium and loaded or installed onto the computer system 600 when needed. Removable program media include, for example, CD-ROM, PC-CARD, floppy disk and magnetic tape. The computer code can include logic for performing the digital image processing described in the above figures and the data can include one or more digital images to be analyzed.

The network interface 612 is used to send and receive data (e.g., a digital image) over a network connected to other computer systems. An interface card or similar device and appropriate software implemented by the microprocessor 616 can be used to connect the computer system 600 to an existing network and transfer data according to standard protocols.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

As used herein in connection with the description of the invention, the term "about" means+/−10%. By way of example, the phrase "about 250" indicates a range of between 225 and 275. With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in any of the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining a number of colors in a digital image comprising:
   receiving a digital image;
   determining a total number of pixels in the digital image;
   selecting a proportion of the total number of pixels as having an infrequent color;
   determining a respective color for each one of a first portion of the pixels; and
   analyzing the respective colors to determine whether the respective colors include greater than or equal to the selected proportion of infrequent color, and if the respective colors include greater than or equal to the selected proportion of infrequent colors then selecting a first subsequent process, and if the respective colors include less than the selected proportion of pixels having the infrequent color then selecting a second subsequent process.

2. The method of claim 1, wherein a frequent color includes a color that occurs greater than or equal to the proportion of the total number of pixels divided by a product of a selected number of frequent colors and an estimating factor.

3. The method of claim 2, wherein the estimating factor has a value of at least 1.

4. The method of claim 2, wherein the estimating factor is a function of a number of pixels included in the first portion of the pixels.

5. The method of claim 2, further comprising:
   if the respective colors include greater than or equal to the selected proportion of infrequent colors then applying the first subsequent process and determining a performance factor of the first subsequent process; and
   if the respective colors include less than the selected proportion of infrequent colors then applying the second subsequent process and determining the performance factor of the second subsequent process.

6. The method of claim 5, further comprising modifying the estimating factor with a function of the performance factor.

7. The method of claim 5, further comprising outputting the processed digital image, wherein the processed digital image has been processed in one of the first subsequent process and the second subsequent process.

8. The method of claim 1, wherein the infrequent color includes more than one infrequent color.

9. The method of claim 8, wherein selecting a proportion of the total number of pixels as being an infrequent color includes selecting a number of frequent colors.

10. The method of claim 1, wherein the infrequent color includes more than about sixteen infrequent colors.

11. The method of claim 1, wherein the first subsequent process includes a first compression scheme.

12. The method of claim 1, wherein the second subsequent process includes a second compression scheme.

13. The method of claim 1, wherein selecting the second subsequent process includes:
   determining if a set of selected pixels is greater than or equal to a proportion of frequent color pixels, wherein if the set of selected pixels is greater than or equal to a proportion of frequent color pixels then the second subsequent process is selected; and
   if the set of selected pixels is less than a proportion of frequent color pixels then:
      a subsequent portion of pixels are selected; and
      a respective color for each one of the subsequent portion of the pixels is determined.

14. A method for determining a number of colors in a digital image comprising:
   receiving a digital image;
   determining a total number of pixels in the digital image;
   selecting a proportion of the total number of pixels as having one of a set of frequent colors, wherein a frequent color includes a color that occurs greater than or equal to the proportion of the total number of pixels divided by a selected number of frequent colors;
   determining a respective color for each one of a first portion of the pixels; and
   analyzing the respective colors to determine whether the respective colors include greater than or equal to the selected proportion of pixels having one of the frequent colors, and if the respective colors include greater than or equal to the selected proportion of pixels having one of the frequent colors then selecting a first compression scheme, and if the respective colors include less than the selected proportion of pixels having one of the frequent colors then selecting a second compression scheme.

15. A system for determining a number of colors in a digital image comprising:
a first computer system including:
logic for receiving a digital image;
logic for determining a total number of pixels in the digital image;
logic for selecting a proportion of the total number of pixels as having a frequent color;
logic for determining a respective color for each on of a first portion of the pixels; and
logic for analyzing the respective colors to determine whether the respective colors include greater than or equal to the selected proportion of pixels having the frequent color, and if the respective colors include greater than or equal to the selected proportion of pixels having the frequent color then selecting a first subsequent process, and if the respective colors include less than the selected proportion of pixels having the frequent color then selecting a second subsequent process.

16. The system of claim 15, further comprising:
logic for applying the first subsequent process, if the respective colors include greater than or equal to the selected proportion of pixels having the frequent color, and determining a performance factor of the first subsequent process; and
logic for applying the second subsequent process, if the respective colors include less than the selected proportion of pixels having the frequent color, and determining the performance factor of the second subsequent process.

17. The system of claim 15, further comprising logic for outputting the processed digital image, wherein the processed digital image has been processed in one of the first subsequent process and the second subsequent process.

18. The system of claim 17, wherein the first computer system further includes a network interface and wherein the network interface couples the first computer system to a second computer system, and wherein the logic for outputting the processed digital image includes logic for outputting the processed digital image to the second computer system.

* * * * *